United States Patent

[11] 3,534,836

| [72] | Inventor | Dan H. Dane<br>Huntsville, Alabama |
|---|---|---|
| [21] | Appl. No. | 758,082 |
| [22] | Filed | Sept. 6, 1968 |
| [45] | Patented | Oct. 20, 1970 |
| [73] | Assignee | The United States of America as represented by the Administrator of the National Aeronautics and Space Administration |

[54] RATCHET MECHANISM
5 Claims, 4 Drawing Figs.

[52] U.S. Cl. .................................................. 192/43.1, 81/63.1
[51] Int. Cl. ..................................................... F16d 13/06, F16d 23/12
[50] Field of Search .......................................... 192/41.3, 43, 43.1; 81/63.1

[56] References Cited
UNITED STATES PATENTS

| 1,569,516 | 1/1926 | Mangham | 192/43 |
| 2,028,876 | 1/1936 | Lotts | 192/41.3UX |
| 2,113,722 | 4/1938 | Dodge | 192/43 |
| 3,086,405 | 4/1963 | Fleming | 192/43.1UX |
| 3,216,544 | 11/1965 | Ryan | 192/41.3UX |

*Primary Examiner*—Allan D. Herrmann
*Attorneys*—L. D. Wofford, Jr., C. C. Wells and G. T. McCoy ABSTRACT: A ratcheting mechanism comprising a housing, a socket member rotatably mounted therein and a number of paired sprag members pivotally mounted in spaced notches on the socket member. A control member mounted in the housing is rotated in either direction to engage and pivot a desired one of each sprag pair away from the housing. The other sprag of each pair will permit rotation of the housing relative to the socket member in the direction of the pivoted sprag, but will jam if the housing is rotated in the other direction, thereby providing a ratcheting action between the housing and socket. A knob attached to one end of the control member for rotating the control member against the sprags is secured through a friction lock to a knob bolted to a shaft that is keyed to the socket member.

INVENTOR
DAN H. DANE

Patented Oct. 20, 1970

INVENTOR
DAN H. DANE

BY *Q. Hun E Cay*
*Charles C. Wells*
ATTORNEYS

RATCHET MECHANISM

The invention described herein was made by an employee of the U.S. Government and may be manufactured and used by or for the Government of the United States of America for governmental purposes without the payment of any royalties thereon or therefor.

BACKGROUND OF THE INVENTION

The invention relates to ratchet mechanisms and more particularly it relates to an improved ratchet mechanism capable of very high speed operation with reduced backlash as compared to presently available ratchet devices.

Ratchet mechanisms available heretofore have generally included a spring and pawl arrangement where the spring biased pawl engages the teeth of a driven gear. The pawl is arranged so as to be cammed away from the gear teeth upon rotation of the gear in one direction, but forced into engagement with the gear teeth to perform a wedging action that immobilizes the gear when the gear is turned in the other direction.

While effective this type of ratchet necessarily includes considerable drag or friction between moving parts like the pawl and gear, particularly when the ratchet is designed to accommodate high loading. Also, a fairly considerable amount of backward or opposite rotation of the driven gear may occur before the pawl wedges into the gear teeth to immobilize the gear. While this backward rotation will normally amount to only a few degrees, even this much backlash is objectionable in many applications. Also, spring and pawl ratchets are noisey at high speed and the pawl will be thrown away from the gear far enough that considerable backward rotation of the gear can occur, perhaps half a turn, before the pawl spring can return the pawl to immobilize the gear against backward motion.

SUMMARY OF THE INVENTION

The present invention provides a ratchet mechanism that is smoother, operates quietly and has no backlash in its 360° rotation. The mechanism can also perform at high r.p.m.s without undesirable side effects like noise and increased backlash that accompany highspeed operation of spring and pawl type ratchets.

This is accomplished by altering a sprag type reverse locking clutch to make it function as a ratchet mechanism. A socket member to which a tool is attached is mounted for rotation in an outer housing. The socket member has a plurality of notches formed in the periphery thereof in which a plurality of sprags are mounted in pairs. The sprags function to immobilize the socket member with respect to the housing when the relative rotation is in one direction, but permit relative rotation in the other direction, thereby providing a ratcheting action between the housing and socket member. A control member is also mounted in the housing and it functions to engage the sprags in a manner such that the direction of relative rotation permitted can be selected. An adjustment mechanism that includes a friction lock is included for rotating and holding the control member in a desired position.

DESCRIPTION OF THE PREFERRED EMBODIMENT

Figure 1:
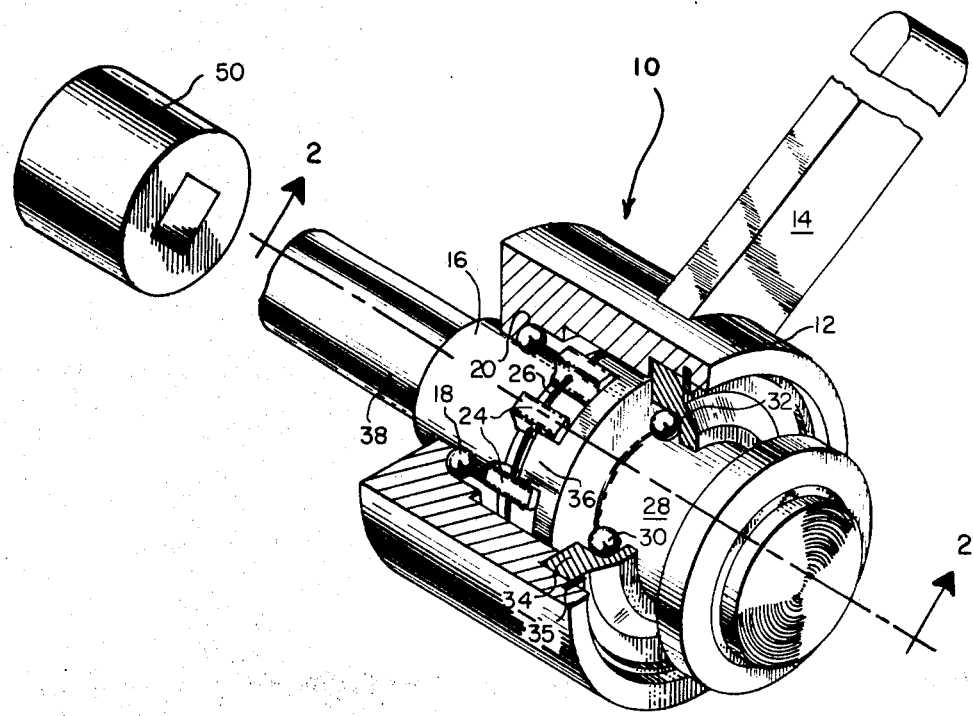
FIG. 1 is a pictorial view of the ratcheting mechanism.
Figure 2:
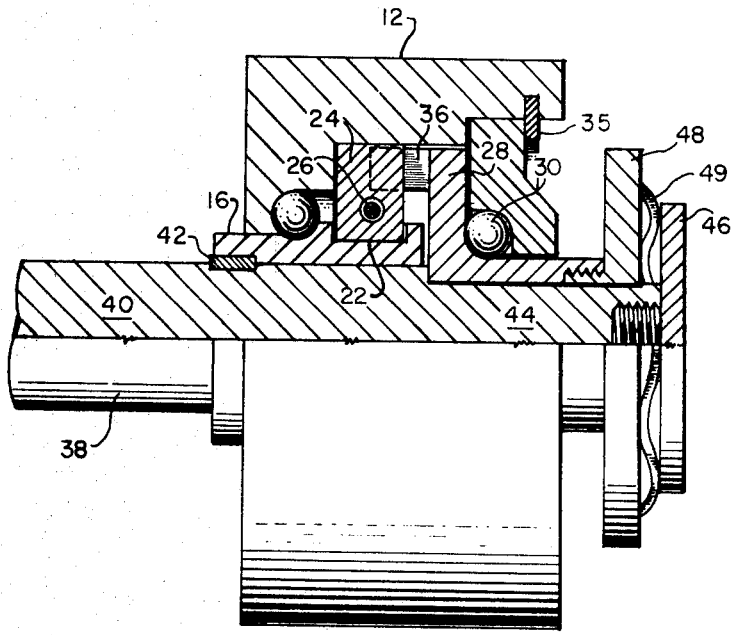
FIG. 2 is a cross-sectional view of the mechanism along line 2-2 of FIG. 1.

Ratchet mechanism 10 shown in FIG. 1 includes an outer housing 12 to which a handle 14 is attached. A socket member 16 is mounted for rotation in housing 12 by means of a ball bearing 18 which rides against surface 20 in housing 12 that serves as a race. The socket member has a series of spaced notches 22 (FIG. 2) formed around the periphery thereof and sprag members 24 are mounted in pairs in these notches. The sprags are held in an upstanding or radially extending position by a coil spring 26 mounted through and attached to each sprag. The sprags, for reasons discussed hereafter, are of such length that they will engage the housing unless pivoted out of contact with the housing.

A control member 28 is mounted in housing 12 and supported for rotation therein by ball bearing 30 which rides against a bearing surface 32 in end cap 34. End cap 34 is secured in place by snap ring 35. The control member includes projecting lug members 36 that extend into the space between the sprags of each sprag pair so as to engage a selected one of the sprags of each sprag pair when the control member if rotated relative to the socket member. Both the socket member and control member are mounted on a shaft 38 whose longitudinal axis coincides with that of housing 12, the control member, and the socket member. It will be noted from FIG. 2 that shaft 38 has a large end 40 keyed to the socket member by key 42 and a smaller end 44. The control member is mounted on end 44 of shaft 38 with a slip fit so as to be rotatable on the shaft. A knob 46 is bolted to end 44 of the shaft and a larger knob 48 is threaded into one end of the control member. Knob 48 and the control member rotate together. A friction or spring washer 49 is positioned around shaft 38 between knobs 46 and 48 to form a friction lock that permits relative rotation between the knobs, and thus relative rotation between the control member and socket member, only when considerable force is exerted on knob 48 and knob 46 is held stationary. Otherwise, when the mechanism is in use for example, such relative rotation does not occur.

Figure 3:
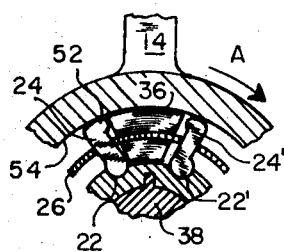
FIGS. 3 and 4 are schematic illustrations of sprag and control member operation.
Figure 4:
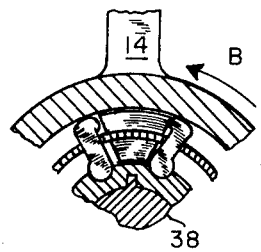

Referring now to FIGS. 3 and 4, the operation of the sprags and control member to control the ratcheting action of the mechanism will be described. In this description it will be assumed that a socket type tool 50, see FIG. 1, is mounted on the large end of shaft 38 for rotation therewith to tighten or loosen a bolt. The action of only one sprag pair and lug member will be described, but as is obvious the description will apply to each sprag pair and associated lug member.

When lug member 36 is rotated relative to the socket member to engage sprag 24 at projection 52, as illustrated in FIG. 3, the sprag will be pivoted away from and out of contact with inner surface 54 of the outer housing. In this position sprag 24 will not contact surface 54 of the housing to interfere with rotation of the housing in the direction of arrow A. Sprag 24' is pivoted in a clockwise direction by any movement of the housing in the direction of the arrow. Movement of the housing with respect to the socket member and sprags in an opposite direction to arrow A will result in sprag 24' being pivoted in a counterclockwise direction until it wedges between the socket member and the outer housing. Notch 22' in the socket member is shaped so as to permit sprag 24' to pivot and similarly notch 22 will permit sprag 24 to pivot. Thus, when the control member is rotated to the position shown in FIG. 3 there can be relative rotation between the housing and socket member (and therefore between handle 14 and socket 50 attached to shaft 38) only in the direction of arrow A. When handle 14 is moved so as to rotate the outer housing in an opposite direction to arrow A the housing and socket member will be immobilized with respect to one another and socket 50 will be turned when handle 14 is turned. Actually, the position shown in FIG. 3 would be used for tightening a bolt or nut and if it were desired to loosen a bolt or nut the control member would be rotated to a position wherein the lug member would engage the sprags as illustrated in FIG. 4.

Operation in the FIG. 4 position will not be described in detail because of the similarity to the mode of operation shown and described in FIG. 3. Suffice it to say that in the FIG. 4 position motion of the outer housing relative to the socket member is permitted when the housing is moved in the direction of arrow B. The socket member and housing are locked together by movement of the housing in a direction opposite to that of arrow B.

When the extending lug members of the control member are rotated relative to the sprag members so that none of the sprag members are contacted, the mechanism will not function as a ratchet. This is because relative rotation of the outer housing with respect to the socket member in either direction results in one sprag of each sprag pair being wedged between the socket member and outer housing so as to immobilize the outer housing with respect to the socket member.

I claim:
1. A ratcheting mechanism comprising:
   a cylindrical housing with a handle attached thereto for rotating said housing;
   a cylindrical socket member rotatably mounted in said housing and having a plurality of spaced notches formed in pairs around the periphery thereof;
   a plurality of spaced and paired sprags pivotally mounted in the notches formed in said socket member, said sprags extending outwardly toward the housing and held in a substantially upright position by a circular coil spring passing through and fastened to each of the sprags, the length of the sprags being such that they will engage the inner surface of said housing unless pivoted away from said housing;
   a cylindrical control member mounted for rotational movement in said housing, said control member having a plurality of projecting lugs on one end thereof positioned between the sprags of each sprag pair, whereby the control member can be rotated to a position wherein the projecting lugs will each engage one sprag of each sprag pair to pivot the engaged sprag away from the housing and thus permit rotation of the housing relative to the socket member in the direction of the pivoted sprag member, and rotation of said housing in the other direction relative to said socket will be prevented due to a wedging action between the housing and socket member of the sprag of each sprag pair not engaged by the control member, whereby the socket member will rotate with the outer housing in only one direction and provide a ratcheting action;
   a shaft mounted through said socket member and said control member, said shaft being fixed to said socket and rotatable in said control member; and
   adjustment means connected to the shaft mounted through said socket member and to said control member for rotating the projecting lug members on said control member relative to said socket member and sprags, thereby selecting the direction of rotation of the outer housing relative to the socket member.

2. The ratcheting mechanism recited in claim 1 wherein said adjustment means further includes:
   a friction locking means that immobilizes the control member relative to said socket member in normal conditions of use, but permits rotation of the control member relative to said socket member when sufficient force is exerted thereon.

3. The ratcheting mechanism recited in claim 2 wherein said adjustment means further includes:
   a first knob mounted on the control member at the other end thereof opposite said projecting lugs for manually rotating said control member and projecting lugs relative to the socket member;
   a second knob mounted on an end of said shaft adjacent said first knob for holding said socket member and sprags stationary while the control member is being rotated.

4. The ratcheting mechanism recited in claim 3 wherein said friction locking means is a curved spring washer disposed between and contacted by said first and second knobs.

5. In a mechanism of the type wherein a cylindrical housing has a cylindrical control member and a cylindrical socket member rotatably mounted therein and a series of spaced and paired sprags pivotally mounted in spaced notches on said socket member and extending radially outwardly to selectively engage the inner surface of the housing to prevent relative rotation between the housing and socket member, the control member including projecting lugs on one end thereof positioned between the sprags of a sprag pair to selectively pivot one sprag of each sprag pair away from the housing to permit rotation of the housing relative to the socket member only in the direction of the pivoted sprag member; an improvement that converts the mechanism to a ratchet comprising:
   means connected to said control member and said socket member for positioning the projecting lugs of said control member relative to said socket member and sprag pairs to select the sprag of each sprag pair to be pivoted away from said outer housing and thereby control the direction in which there can be relative rotation between the outer housing and the socket member;
   handle means mounted on said housing for rotation thereof;
   said means connected to said control member and said socket member including,
      a shaft that is fixed to said socket member and rotatable in said control member, one end of said shaft being adapted to have a tool mounted thereon;
      a first knob fixed to said control member on the end thereof opposite said projecting lugs, said first knob being mounted over said shaft;
      a second knob fastened to said shaft and positioned adjacent said first knob; and
      a friction locking means positioned between said first and second knobs that immobilizes the control member relative to said socket member in normal conditions of use, but permits relative rotation therebetween when sufficient force is exerted on the control member and the shaft is held stationary.

6. The mechanism recited in claim 5 wherein said friction locking means is a spring washer.